US012741662B2

(12) United States Patent
Kunii et al.

(10) Patent No.: US 12,741,662 B2
(45) Date of Patent: Sep. 22, 2026

(54) INFORMATION PROCESSING DEVICE AND INFORMATION PROCESSING METHOD

(71) Applicant: Nissan Motor Co., Ltd., Kanagawa (JP)

(72) Inventors: Yuta Kunii, Kanagawa (JP); Atsunobu Kaminuma, Kanagawa (JP)

(73) Assignee: Nissan Motor Co., Ltd., Kanagawa (JP)

( * ) Notice: Subject to any disclaimer, the term of this patent is extended or adjusted under 35 U.S.C. 154(b) by 128 days.

(21) Appl. No.: 18/832,778

(22) PCT Filed: Jan. 26, 2022

(86) PCT No.: PCT/JP2022/002774
§ 371 (c)(1),
(2) Date: Jul. 24, 2024

(87) PCT Pub. No.: WO2023/144903
PCT Pub. Date: Aug. 3, 2023

(65) Prior Publication Data

US 2025/0162606 A1 May 22, 2025

(51) Int. Cl.
*G10L 15/22* (2006.01)
*B60W 50/14* (2020.01)

(52) U.S. Cl.
CPC ............. *B60W 50/14* (2013.01); *G10L 15/22* (2013.01); *B60W 2540/21* (2020.02); *G10L 2015/223* (2013.01); *G10L 2015/225* (2013.01)

(58) Field of Classification Search
CPC .. B60W 50/14; B60W 50/08; B60W 2540/21; B60W 40/10; G06F 3/167; G10L 15/22; G10L 2015/225; G10L 2015/223; G07C 5/0833
USPC .......................................................... 704/275
See application file for complete search history.

(56) References Cited

U.S. PATENT DOCUMENTS 7,750,795 B2 7/2010 Nagata
2008/0316009 A1 12/2008 Nagata
2014/0022106 A1* 1/2014 Duvoisin ............ G01S 13/0209 342/22
2018/0204751 A1 7/2018 Gallagher et al.
2020/0005778 A1 1/2020 Kim et al.
2020/0207266 A1* 7/2020 Morimura ............. B60W 40/10

FOREIGN PATENT DOCUMENTS

JP 2006193138 A 7/2006
JP 2017067850 A 4/2017
JP 2019127192 A 8/2019
JP 2021093087 A 6/2021

* cited by examiner

*Primary Examiner* — Md S Elahee
(74) *Attorney, Agent, or Firm* — Osha Bergman Watanabe & Burton LLP

(57) ABSTRACT

An information processing device includes a controller configured to perform processing including: receiving a state of notification performed by a predetermined notification device configured to notify, based on a detection result of a state of a unit in a predetermined device, a state of the unit; acquiring voice data uttered by a user; generating, according to the received state of notification, reply data with respect to the acquired voice data; and outputting the generated reply data.

10 Claims, 5 Drawing Sheets

FIG. 3

| NOTIFICATION TARGET DATA | NOTIFICATION FORM DATA | | | DESCRIPTION DATA |
|---|---|---|---|---|
| | POSITION (LOCATION) | COLOR | SHAPE | |
| TURNING-ON OF REFUELING LAMP | RIGHT-HAND SIDE OF METER DISPLAY | ORANGE | GAS STATION | The amount of remaining gasoline is small, and the car needs to be refueled. |
| HIGH BEAM WARNING LAMP | UPPER PORTION OF METER | BLUE | LAMP | The headlights are set to the high beam. When an oncoming vehicle is approaching, change the headlights to the low beam using the operation lever. |
| LOW WATER TEMPERATURE INDICATOR LAMP | RIGHT-HAND SIDE OF METER DISPLAY | BLUE | THERMOMETER | The indicator lamp indicates that water temperature of engine cooling water is low. When the lamp is not turned off even after traveling for a while, have your car dealer check the radiator. |
| BRAKE WARNING LAMP | UPPER PORTION OF METER | RED | EXCLAMATION MARK | Stop the car and check the remaining amount of brake fluid. |
| VDC OFF INDICATOR | LEFT-HAND SIDE OF METER DISPLAY | YELLOW | SLIPPING VEHICLE : OFF | VDC is turned off. To turn on VDC, change the setting in the setting window of the navigation system. |
| TIRE PRESSURE WARNING LAMP | UPPER PORTION OF METER | YELLOW | EXCLAMATION MARK | Park the car at a safe place, and check air pressure of the tires. |

START
S20
NOTIFIED TO USER?
N
Y
START VOICE RECOGNITION MODE
S21
N
RECEIVED VOICE INPUT?
S22
Y
IDENTIFY NOTIFICATION TARGET
S23
RETRIEVE ATTRIBUTE DATA OF NOTIFICATION TARGET FROM DATABASE
S24
PERFORM VOICE RECOGNITION
S25
S26
UTTERANCE ABOUT NOTIFICATION TARGET?
N
Y
ACQUIRE DESCRIPTION DATA
S27
OUTPUT REPLY DATA
S28
END

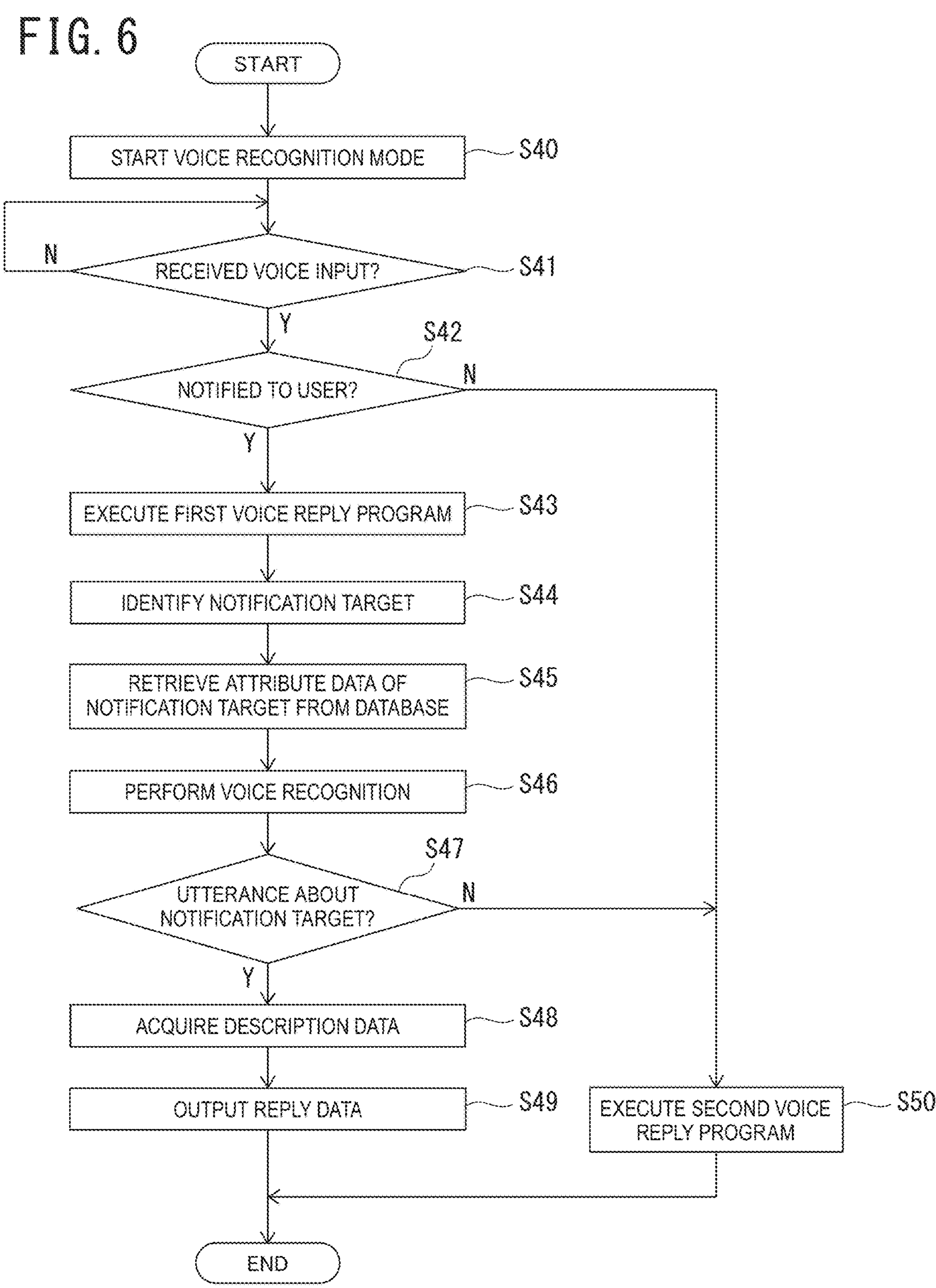
FIG. 6
START
START VOICE RECOGNITION MODE
S40
RECEIVED VOICE INPUT?
S41
N
Y
NOTIFIED TO USER?
S42
N
Y
EXECUTE FIRST VOICE REPLY PROGRAM
S43
IDENTIFY NOTIFICATION TARGET
S44
RETRIEVE ATTRIBUTE DATA OF NOTIFICATION TARGET FROM DATABASE
S45
PERFORM VOICE RECOGNITION
S46
UTTERANCE ABOUT NOTIFICATION TARGET?
S47
N
Y
ACQUIRE DESCRIPTION DATA
S48
OUTPUT REPLY DATA
S49
EXECUTE SECOND VOICE REPLY PROGRAM
S50
END

INFORMATION PROCESSING DEVICE AND INFORMATION PROCESSING METHOD

TECHNICAL FIELD

The present invention relates to an information processing device and an information processing method.

BACKGROUND ART

Notification devices that detect a state of a unit in a device and perform notification according to the detected state have been known. For example, in PTL 1 described below, a technology for, when detecting an abnormality having occurred in a vehicle, turning on a warning lamp in a meter panel or displaying a warning icon in a navigation device is disclosed.

CITATION LIST

Patent Literature

PTL1: JP 2006-193138 A

SUMMARY OF INVENTION

Technical Problem

However, there have been a problem in that when a form of notification performed by a notification device is simplified as, for example, the warning lamp in PTL 1, it is difficult for a user to understand what is notified.

An object of the present invention is to promote understanding by a user of meaning of notification output from a notification device.

Solution to Problem

According to an aspect of the present invention, there is provided an information processing device including a controller configured to perform processing including: receiving a state of notification performed by a predetermined notification device configured to notify, based on a detection result of a state of a unit in a predetermined device, a state of the unit; acquiring voice data uttered by a user; generating, according to the received state of notification, reply data with respect to the acquired voice data; and outputting the generated reply data.

Advantageous Effects of Invention

According to an aspect of the present invention, it is possible to promote understanding by a user of meaning of notification output from a notification device.

The object and advantages of the invention will be realized and attained by means of the elements and combinations particularly pointed out in the claims. It is to be understood that both the foregoing general description and the following detailed description are exemplary and explanatory and are not restrictive of the invention.

BRIEF DESCRIPTION OF DRAWINGS

FIG. 3 is a table for a description of an example of an attribute database;

FIG. 6 is a flowchart of an example of an information processing method of a variation.

DESCRIPTION OF EMBODIMENTS

Embodiments of the present invention will be described below with reference to the drawings. Note that although in the following description, an example of a case where a state of an in-vehicle unit mounted on a vehicle is detected and notified will be described, the present invention is not limited to application to a vehicle or an in-vehicle unit, and the present invention is widely applicable to a case where in a device used for various uses, a state of a unit installed in the device is detected and notified.

First Embodiment (Configuration)

Figure 1:
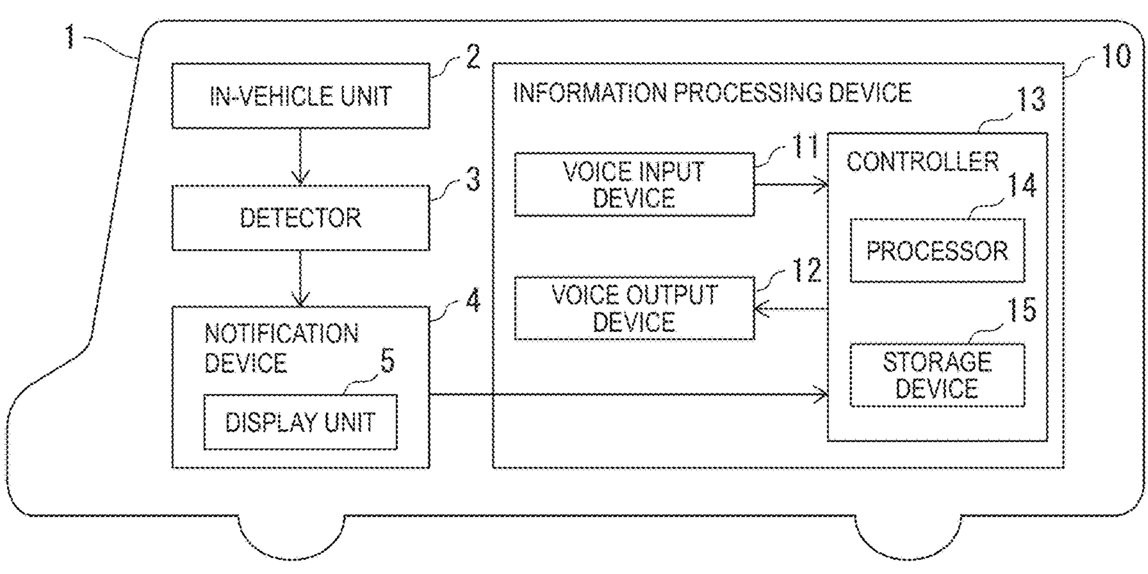
FIG. 1 is a schematic configuration diagram of an example of a vehicle that includes an information processing device of embodiments.

FIG. 1 is a schematic configuration diagram of an example of a vehicle that includes an information processing device of a first embodiment. On a vehicle 1, in-vehicle units 2, a detector 3, a notification device 4, and an information processing device 10 are mounted.

The in-vehicle units 2 are various types of devices mounted on the vehicle 1. The in-vehicle units 2 may be, for example, a fuel tank, headlights, a radiator, a braking device, a vehicle dynamics control (VDC) device, or tires.

The detector 3 detects states of the in-vehicle units 2. For example, the detector 3 may detect an abnormal state of the in-vehicle units 2. The detector 3 may be sensors that detect the states of the in-vehicle units 2 or an electronic control unit (ECU) that sets states (control parameters or flags) of the in-vehicle units 2. When an in-vehicle unit 2 is an electronic control unit, the detector 3 may be a self-diagnosis program of the electronic control unit.

For example, the detector 3 may detect the amount of remaining fuel in the fuel tank (for example, the amount of remaining fuel being small). In addition, for example, the detector 3 may detect a direction of the headlights (for example, a high beam or an upper forward direction). In addition, for example, the detector 3 may detect water temperature of cooling water of the radiator (for example, the water temperature being lower than a threshold value). In addition, for example, the detector 3 may detect a state of the braking device (for example, an abnormal state of the braking device). In addition, for example, the detector 3 may detect an operating state of the vehicle dynamics control (VDC) device (for example, the VDC device being in an off state). In addition, for example, the detector 3 may detect tire pressure (for example, an abnormality in the tire pressure).

The detector 3 outputs a detection signal indicating a detection result to the notification device 4.

The notification device 4 notifies a user (for example, a driver or a passenger) of the vehicle 1 of a state of an in-vehicle unit 2 detected by the detector 3, according to a detection signal received from the detector 3.

The notification device 4 includes a display unit 5 that outputs visual information representing a state of each in-vehicle unit 2 detected by the detector 3. The display unit 5 may be, for example, a lamp (for example, a warning lamp) that is installed in a meter disposed in front of a driver seat or in a vicinity of the meter. The notification device 4 may notify the state of an in-vehicle unit 2 by turning on a lamp that is installed in the display unit 5 in a corresponding manner to the in-vehicle unit 2, based on a detection signal received from the detector 3.

In addition, the display unit 5 may be a display device that is installed in the meter disposed in front of the driver seat or in the vicinity of the meter or a display device of a navigation device. The notification device 4 may notify a state of an in-vehicle unit 2 by displaying an icon (for example, a warning icon) corresponding to the in-vehicle unit 2, based on a detection signal received from the detector 3. In the following description, each of the above-described lamp and icon is sometimes referred to as "notification target" of the notification device 4.

For example, the notification device 4 may turn on a refueling lamp that is arranged on the right-hand side of a meter display, as a notification target for indicating that the amount of remaining fuel in the fuel tank is small. In addition, for example, the notification device 4 may turn on a high beam warning lamp that is arranged in an upper portion of the meter, as a notification target for indicating that the headlights are in a high-beam state. In addition, for example, the notification device 4 may turn on a low water temperature indicator lamp that is arranged on the right-hand side of the meter display, as a notification target for indicating that the water temperature of the cooling water of the radiator is lower than the threshold value.

In addition, for example, the notification device 4 may turn on a brake warning lamp that is arranged in the upper portion of the meter, as a notification target for indicating that the braking device is in an abnormal state. In addition, for example, the notification device 4 may turn on a VDC off indicator lamp that is arranged on the left-hand side of the meter display, as a notification target for indicating that the vehicle dynamics control (VDC) device is in an off state. In addition, for example, the notification device 4 may turn on a tire pressure warning lamp that is arranged in the upper portion of the meter, as a notification target for indicating an abnormality in the tire pressure.

When a form of notification performed by the notification device 4 is simplified as a lamp (for example, a warning lamp) or an icon (for example, a warning icon) as described above, there is a risk that it becomes difficult for the user to understand what is notified.

Accordingly, the information processing device 10 receives a state of notification performed by the notification device 4, which notifies, based on a detection result of a state of an in-vehicle unit 2 in the vehicle 1, the state of the in-vehicle unit 2, acquires voice data uttered by the user, generates reply data with respect to the acquired voice data according to the received state of notification, and outputs the generated reply data to the user.

By generating reply data according to the state of notification performed by the notification device 4 at the time of acquiring voice data uttered by the user in this way, it becomes possible to output reply data describing what the notification device 4 is notifying, to the user. As a result, understanding by the user of meaning of notification output from the notification device 4 can be promoted.

Figure 2A:
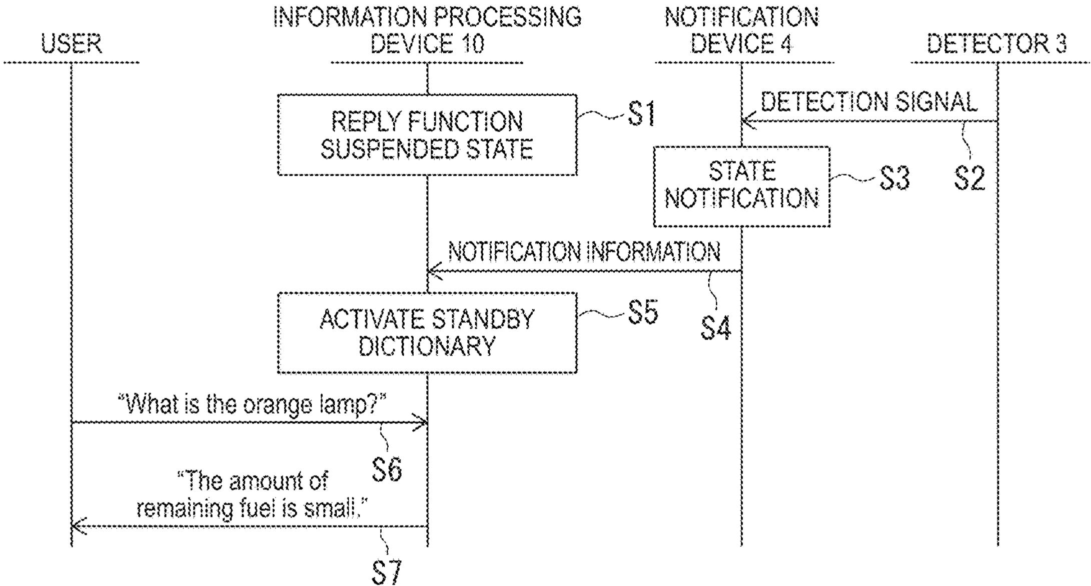
FIG. 2A is a sequence diagram descriptive of an operation example when notification to a user is performed.
Figure 2B:
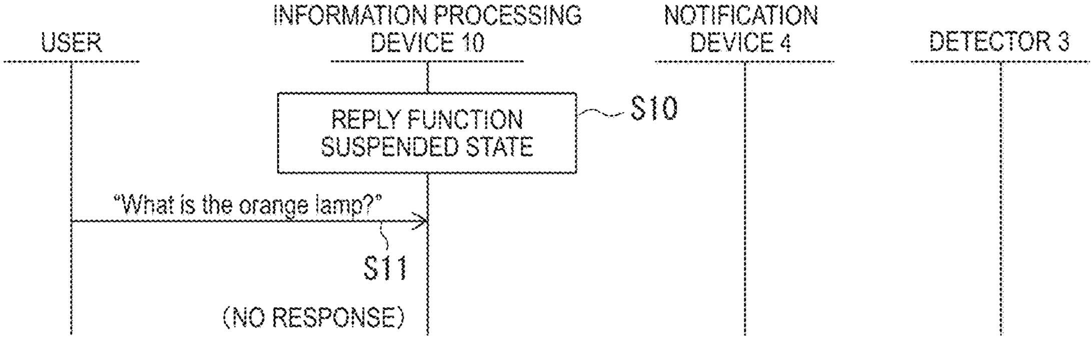
FIG. 2B is a sequence diagram descriptive of an operation example when no notification to the user is performed.

With reference to FIGS. 2A and 2B, an outline of an example of operation of the information processing device 10 will be described. Note that sequence diagrams in FIGS. 2A and 2B illustrate a case where a function of the information processing device 10 replying to an utterance of the user is started from a state of being suspended (steps S1 and S10).

In step S2, the detector 3 that has detected a state of an in-vehicle unit 2 outputs a detection signal indicating a detection result to the notification device 4.

In step S3, the notification device 4 notifies the user of the state of the in-vehicle unit 2 detected by the detector 3.

In step S4, the notification device 4 transmits notification information that indicates a state of notification notifying the state of the in-vehicle unit 2, to the information processing device 10.

The information processing device 10 that receives the notification information from the notification device 4 starts a voice recognition mode in step S5. The voice recognition mode is an operation mode in which the information processing device 10 recognizes voice data uttered by the user and replies to an utterance of the user relating to a notification target of the notification device 4. On this occasion, in order to determine whether or not the utterance of the user is an utterance relating to the notification target of the notification device 4, the information processing device 10 activates a standby dictionary (vocabulary data) that is to be compared with the voice data uttered by the user.

In step S6, when the information processing device 10 acquires voice data uttered by the user (for example, "What is the orange lamp?"), the information processing device 10, by performing voice recognition on the acquired voice data and comparing a voice recognition result with the standby dictionary, determines whether or not the utterance of the user is an utterance relating to the notification target of the notification device 4.

When the utterance of the user is an utterance relating to the notification target of the notification device 4, the information processing device 10 generates, in step S7, reply data (for example, "The amount of remaining fuel is small.") with respect to the voice data (for example, "What is the orange lamp?") and outputs the generated reply data to the user.

Since through this operation, the information processing device 10 can output reply data including a description relating to a notification target of the notification device 4 according to an utterance of the user, the information processing device 10 is capable of promoting understanding by the user of meaning of notification output from the notification device 4. For example, the information processing device 10 may have a dialogue with the user by outputting reply data as auditory information (for example, voice data).

For a comparison purpose, an operation example of the information processing device 10 in the case where the notification device 4 does not perform notification will be described. FIG. 2B is now referred to.

In step S11, the information processing device 10 acquires voice data uttered by the user (for example, "What is the orange lamp?"). At this time point, the information processing device 10 has not received notification information from the notification device 4, and the voice recognition mode has not been started. Therefore, the information processing device 10 does not output reply data with respect to the voice data.

When the information processing device 10 is in a state of not having received notification information as described above, suspending the function to reply to an utterance of the user relating to a notification target of the notification device 4 enables the information processing device 10 to be prevented from unnecessarily outputting reply data. For example, it is possible to prevent the information processing device 10 from falsely recognizing that an utterance included in conversation between the user and another passenger is a question to the information processing device 10 relating to a notification target and unnecessarily outputting reply data.

The information processing device 10 will be described below. FIG. 1 is now referred to. The information processing device 10 is an electronic device that provide the user of the vehicle 1 with various types of information. For example, the information processing device 10 may be an in-vehicle infotainment device. The information processing device 10 includes a voice input device 11, a voice output device 12, and a controller 13.

The voice input device 11 and the voice output device 12 are used for voice dialogue between the information processing device 10 and the user. The voice input device 11 detects a voice uttered by the user, converts the detected voice to electrical voice data, and inputs the electrical voice data to the controller 13. The voice input device 11 may be a microphone.

The voice output device 12 converts electrical voice data output from the information processing device 10 to an auditory voice and outputs the auditory voice to the user.

Note that the information processing device 10 may include, in addition to the voice output device 12, a display device that outputs visual information.

The controller 13 is an electronic control unit that controls the information processing device 10, and includes a processor 14 and peripheral components, such as a storage device 15. The processor 14 may be, for example, a central processing unit (CPU) or a micro-processing unit (MPU). The storage device 15 may include a semiconductor storage device, a magnetic storage device, an optical storage device, or the like. The storage device 15 may include registers, a cache memory, and a memory, such as a read only memory (ROM) and a random access memory (RAM), that is used as a main storage device. Functions of the controller 13, which will be described below, are achieved by, for example, the processor 14 executing computer programs stored in the storage device 15.

Note that the controller 13 may be formed using dedicated hardware for performing various types of information processing that will be described below. For example, the controller 13 may include a functional logic circuit that is implemented in a general-purpose semiconductor integrated circuit. For example, the controller 13 may include a programmable logic device (PLD), such as a field-programmable gate array (FPGA), and the like.

The controller 13 receives notification information output from the notification device 4. The notification information is information indicating a state of notification performed by the notification device 4. For example, the notification information may be information that indicates by which notification target (for example, a lamp, such as a warning lamp, or an icon, such as a warning icon) the notification device 4 performs notification.

The controller 13 determines, based on received notification information, whether or not notification by the notification device 4 is performed to the user. When the notification by the notification device 4 is performed to the user, the controller 13 starts the voice recognition mode in which the information processing device 10 replies to an utterance of the user relating to the notification target of the notification device 4. When the notification by the notification device 4 is not performed to the user, the controller 13 does not start the voice recognition mode as in the operation example in FIG. 2B.

When the controller 13 acquires, from the voice input device 11, voice data uttered by the user when the information processing device 10 is operating in the voice recognition mode, the controller 13 identifies, based on the notification information, a notification target used in the notification performed by the notification device 4.

Further, the controller 13 retrieves attribute data indicating an attribute of the identified notification target from an attribute database stored in the storage device 15.

In the attribute database, with respect to each of one or more in-vehicle units 2 mounted on the vehicle 1, notification target data, notification form data, and description data are stored in association with one another as attribute data.

FIG. 3 is a table for a description of an example of the attribute database.

The notification target data are data that indicate a notification target that is used for the notification device 4 to indicate a state of an in-vehicle unit 2. For example, notification target data relating to the "fuel tank", which is one of the in-vehicle units 2, are the "refueling lamp" (the first row in the table in FIG. 3).

The notification form data are data that indicate a form of notification using a notification target. For example, the notification form data may be data that indicate a position (location) at which notification is performed using a notification target and a color and shape of a lamp or an icon that is a notification target. For example, in the example of the notification form data in FIG. 3, a position (location) at which the "refueling lamp", which is one of the notification targets, is turned on is located on the "right-hand side of the meter display", a lighting color of the "refueling lamp" is "orange", and a shape of the "refueling lamp" is a mark indicating a "gas station".

The description data are data that indicate meaning of notification using a notification target and are output as reply data in step S7 in FIG. 2A. For example, in the example of the notification form data in FIG. 3, meaning of notification performed by turning on the "refueling lamp", which is one of the notification targets, is "The amount of remaining gasoline is small, and the car needs to be refueled".

FIG. 1 is now referred to. On the other hand, the controller 13 recognizes an utterance of the user by converting voice data of the user acquired from the voice input device 11 to text information by subjecting the voice data to voice recognition processing. The controller 13 determines, based on a recognition result of the utterance of the user, whether or not the utterance of the user is an utterance relating to the notification target identified based on the notification information (that is, a notification target used for notification performed by the notification device 4).

For example, the controller 13 may, by comparing notification form data stored in association with the notification target data of the notification target identified based on the notification information with the utterance of the user, determine whether or not the utterance of the user is an utterance relating to the notification target identified based on the notification information.

For example, when one or more words or phrases that are stored as notification form data or meanings thereof are included in the utterance of the user, the controller 13 may determine that the utterance of the user is an utterance relating to the notification target, and when neither a word or phrase stored as notification form data nor meaning thereof is included in the utterance of the user, the controller 13 may determine that the utterance of the user is not an utterance relating to the notification target.

For example, in the case of the "refueling lamp", which is one of the notification targets, when a phrase "orange" or "gas station", which are stored as notification form data, is included in the utterance of the user, the controller 13 may determine that the utterance of the user is an utterance relating to the notification target. Alternatively, determination precision may be improved by determining that the utterance of the user is an utterance relating to the notification target when a combination of two or more ones of phrases "right-hand side of the meter display", "orange", and "gas station", which are stored as notification form data, is included in the utterance of the user.

When the utterance of the user is an utterance relating to a notification target identified based on notification information, the controller 13 acquires description data that are stored in association with notification target data of the notification target, as reply data with respect to the voice data of the user. The controller 13 outputs the acquired reply data to the voice output device 12. The voice output device 12 converts electrical reply data output from the information processing device 10 to an auditory voice and outputs the auditory voice to the user.

Note that in addition to or in place of an auditory voice, the controller 13 may display reply data on the display device as visual information (for example, a text message). For example, the controller 13 may display the reply data on a display device of the in-vehicle infotainment device serving as the information processing device 10, the display device that is installed in the meter or in the vicinity of the meter, or the display device of the navigation device.

In addition, when the controller 13 acquires voice data uttered by the user before a predetermined time has elapsed since a time point at which notification of a state of an in-vehicle unit 2 by the notification device 4 was started (for example, since a time point at which the controller 13 received notification information from the notification device 4), the controller 13 performs the above-described processing of generating reply data, and when the controller 13 does not acquire voice data even when the predetermined time has elapsed since the notification was started, the controller 13 does not have to perform the processing of generating reply data even when the notification by the notification device 4 continues after the predetermined time has elapsed.

In addition, for example, when the controller 13 acquires voice data including an utterance relating to a notification target before a predetermined time has elapsed since a time point at which notification was started, the controller 13 performs the above-described processing of generating reply data, and when the controller 13 does not acquire voice data including an utterance relating to the notification target even when the predetermined time has elapsed since the notification was started, the controller 13 does not have to perform the processing of generating reply data even when the notification by the notification device 4 continues after the predetermined time has elapsed.

(Operation)

Figure 4:
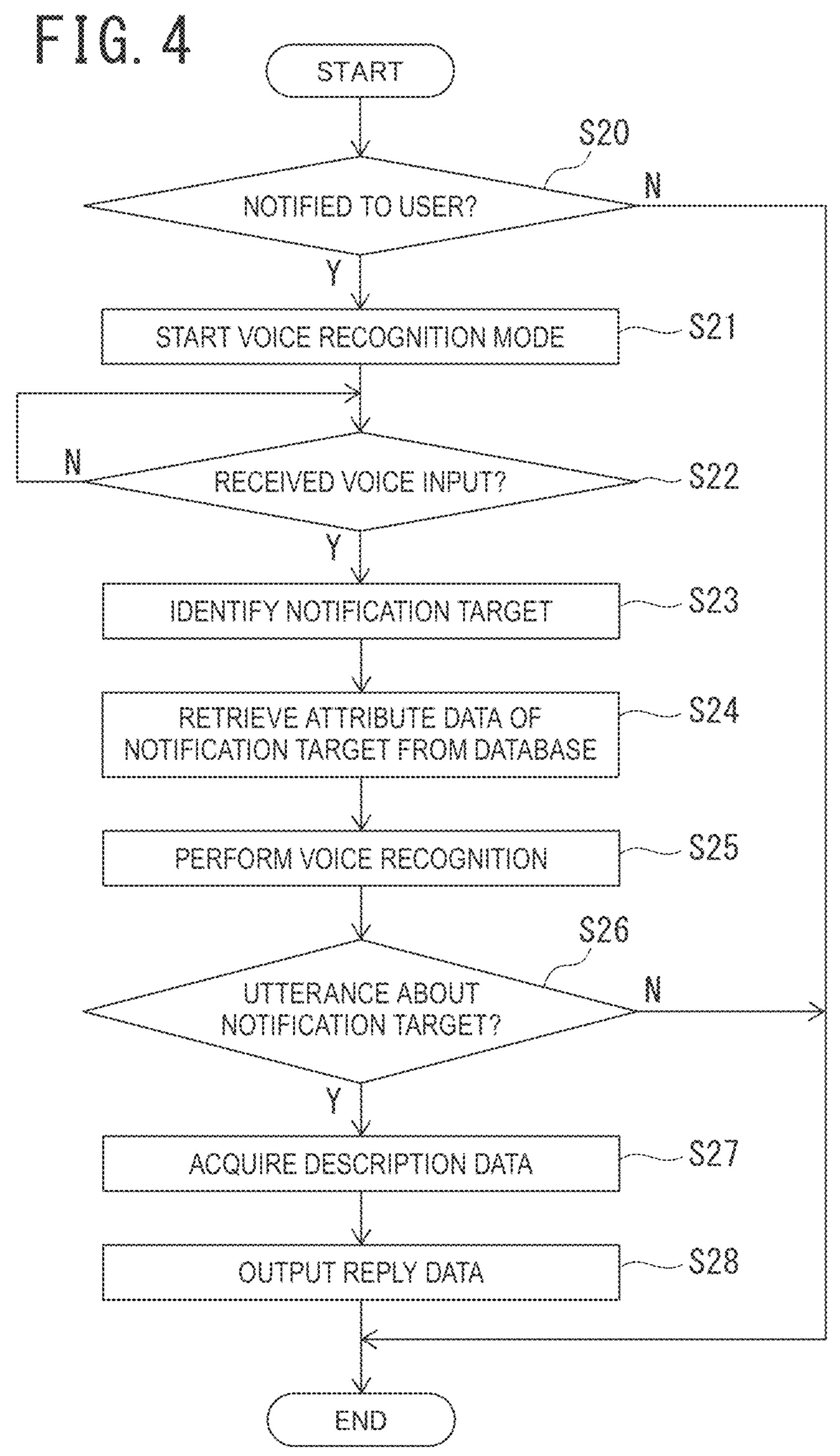
FIG. 4 is a flowchart of an example of an information processing method of a first embodiment.

FIG. 4 is a flowchart of an example of an information processing method of the first embodiment. In step S20, the controller 13 determines, based on notification information received from the notification device 4, whether or not notification by the notification device 4 is performed to the user. When notification is performed (step S20: Y), the process proceeds to step S21. When notification is not performed (step S20: N), the process terminates.

In step S21, the controller 13 starts the voice recognition mode in which the information processing device 10 replies to an utterance of the user relating to a notification target of the notification device 4.

In step S22, the controller 13 determines whether or not the controller 13 has acquired voice data uttered by the user from the voice input device 11. When the controller 13 has acquired voice data (step S22: Y), the process proceeds to step S23. When the controller 13 has not acquired voice data (step S22: N), the process returns to step S22.

In step S23, the controller 13 identifies a notification target, based on the notification information.

In step S24, the controller 13 retrieves attribute data of the notification target identified in step S23.

In step S25, the controller 13 recognizes an utterance of the user by subjecting the voice data of the user acquired from the voice input device 11 to voice recognition processing.

In step S26, the controller 13 determines whether or not the utterance of the user is an utterance relating to the notification target identified in step S23. When the utterance of the user is an utterance relating to the notification target (step S26: Y), the process proceeds to step S27. When the utterance of the user is not an utterance relating to the notification target (step S26: N), the process terminates.

In step S27, the controller 13 acquires description data stored in association with notification target data of the notification target identified in step S23, as reply data.

In step S28, the controller 13 outputs the reply data to the voice output device 12. The voice output device 12 converts the reply data to an auditory voice and outputs the auditory voice, and subsequently the process terminates.

Second Embodiment

A processor 14 of an information processing device 10 of a second embodiment generates reply data with respect to voice data uttered by a user by executing a first voice reply program configured to generate reply data matching a state of notification and a second voice reply program that is different from the first voice reply program.

Processing of generating reply data in the first voice reply program is the same as the processing in the first embodiment.

On the other hand, the second voice reply program may be, for example, a general-purpose voice reply program, and may be, for example, a program configured to perform voice recognition processing by the user uttering a specific phrase (for example, a wakeup word) or the user operating a user interface (for example, a specific switch) of the information processing device 10.

Note that the first voice reply program may also be a program configured to perform the voice recognition processing by the user uttering a specific phrase or the user operating the user interface of the information processing device 10.

For example, it may be configured such that the first voice reply program is a program configured to start the voice recognition processing for replying to an utterance of the user without receiving a specific phrase instructing start of the voice recognition mode from the user and the second voice reply program is a program configured to start the voice recognition mode after receiving a specific phrase instructing start of the voice recognition mode. In this case, it is possible to, when notification is performed, enable a prompt reply to be returned to an utterance from the user and, when notification is not performed, prevent an erroneous operation, such as recognizing an unintended voice of the user.

A controller 13 of the second embodiment determines, based on notification information received from a notification device 4, whether or not notification by the notification device 4 is performed to the user. When the notification by the notification device 4 is performed to the user, the controller 13 generates reply data with respect to voice data from the user by the first voice reply program. When the notification by the notification device 4 is not performed to the user, the controller 13 generates reply data with respect to the voice data from the user by the second voice reply program.

Figure 5:
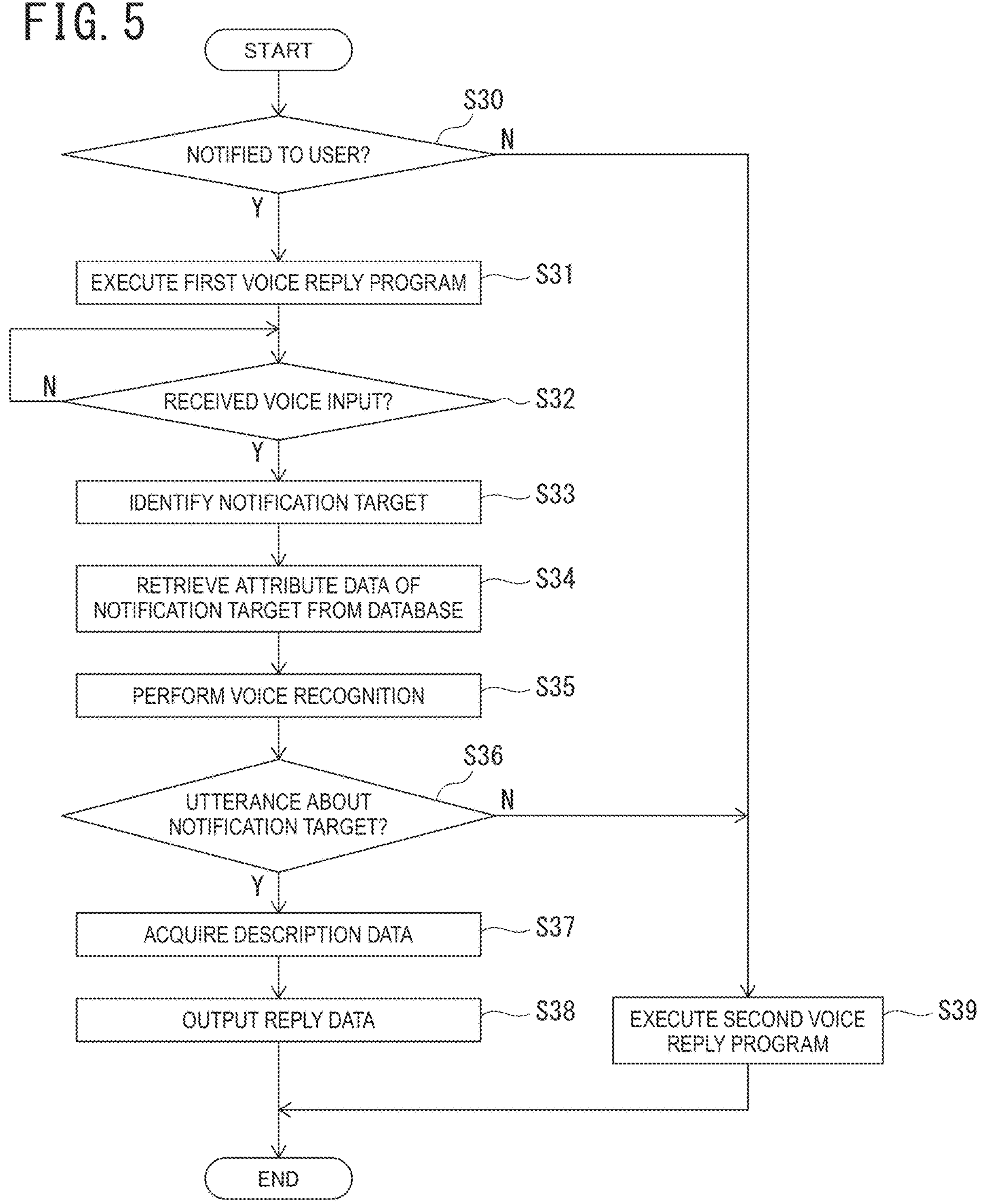
FIG. 5 is a flowchart of an example of an information processing method of a second embodiment.

FIG. 5 is a flowchart of an example of an information processing method of the second embodiment.

In step S30, the controller 13 determines, based on notification information received from the notification device 4, whether or not notification by the notification device 4 is performed to the user. When notification is performed (step S30: Y), the process proceeds to step S31. When notification is not performed (step S30: N), the process proceeds to step S39.

In step S31, the controller 13, by executing the first voice reply program, performs the following processing in steps S32 to S37.

Processing in steps S32 to S35 are the same as the processing in steps S22 to S25 in FIG. 4. After step S35, the process proceeds to step S36.

In step S36, the controller 13 determines whether or not an utterance of the user is an utterance relating to a notification target identified in step S33. When the utterance of the user is an utterance relating to the notification target (step S36: Y), the process proceeds to step S37. When the utterance of the user is not an utterance relating to the notification target (step S36: N), the process proceeds to step S39.

Processing in steps S37 and S38 are the same as the processing in steps S27 and S28 in FIG. 4. Subsequently, the process terminates.

In step S39, the controller 13 executes the second voice reply program. Subsequently, the process terminates.

(Variation)

The controller 13 of the above-described first embodiment, when notification by the notification device 4 is performed, starts the voice recognition mode in which the information processing device 10 replies to a question of the user relating to a notification target of the notification device 4 and acquires voice data uttered by the user from the voice input device 11, as in steps S20 to S22 in FIG. 4. Instead of this configuration, the controller 13 may, after acquiring voice data from the voice input device 11, determine whether or not notification by the notification device 4 is performed and, when notification by the notification device 4 is performed, generate reply data by the first voice reply program and, when notification by the notification device 4 is not performed, generate reply data by the second voice reply program.

FIG. 6 is a flowchart of an example of an information processing method of a variation.

In step S40, the controller 13 starts the voice recognition mode.

In step S41, the controller 13 determines whether or not the controller 13 has acquired voice data uttered by the user. When the controller 13 has acquired voice data (step S41: Y), the process proceeds to step S42. When the controller 13 has not acquired voice data (step S41: N), the process returns to step S41.

In step S42, the controller 13 determines, based on notification information received from the notification device 4, whether or not notification by the notification device 4 is performed to the user. When notification is performed (step S42: Y), the process proceeds to step S43. When notification is not performed (step S42: N), the process proceeds to step S50.

Processing in steps S43 to S50 are the same as the processing in steps S31, and S33 to S39 in FIG. 5.

Advantageous Effects of Embodiments (1) The controller 13 of the information processing device 10 performs processing of receiving a state of notification performed by the notification device 4 that notifies, based on a detection result of a state of a unit in a predetermined device, the state of the unit, processing of acquiring voice data uttered by the user, processing of generating reply data with respect to the acquired voice data according to the received state of notification, and processing of outputting the generated reply data.

Since because of this configuration, the information processing device 10 can output reply data including a description relating to a notification target of the notification device 4 according to an utterance of the user, the information processing device 10 is capable of promoting understanding by the user of meaning of notification output from the notification device 4. For example, even when notification performed by the notification device 4 is simplified, understanding of meaning of the notification by the user can be promoted. Because of this capability, it is possible to improve ability of a computer that provides information about a state of a unit detected by the detector 3.

In addition, since understanding by the user can be promoted even when a form of visual notification performed by the notification device 4 is simplified, a degree of freedom in layout of a notification target (a lamp or an icon) of the notification device 4 can be improved. Therefore, a degree of freedom in design of the notification device 4 can be improved.

In addition, since output of reply data can be suspended depending on the state of notification, the information processing device 10 can be prevented from unnecessarily outputting reply data. For example, it is possible to prevent the information processing device 10 from falsely recognizing that an utterance included in conversation between the user and another passenger is a question to the information processing device 10 relating to a notification target and reply data from being unnecessarily output. In addition, an increase in a processing load due to outputting unnecessary reply data can be suppressed.

(2) The controller 13 may perform, based on the received state of notification, processing of identifying a notification target of the notification device 4 and processing of generating, as reply data, description data about meaning of notification that are stored in advance in association with the identified notification target. Because of this configuration, description data of notification performed by the notification device 4 can be output as reply data.

(3) The controller 13 may perform, based on the received state of notification, processing of determining whether or not the state of a unit is notified by the notification device 4, processing of, when determining that the state of the unit is notified, generating reply data by the first voice reply program that generates reply data matching the state of notification, and processing of, when not determining that the state of the unit is notified, generating reply data by the second voice reply program that is different from the first voice reply program.

Because of this configuration, in the case where the state of a unit is notified, reply data can be generated by the dedicated first voice reply program, and in the other case, reply data can be generated by the general-purpose second voice reply program.

(4) The second voice reply program may be a program configured to start voice recognition processing by a specific phrase. Because of this configuration, it is possible to prevent the information processing device from falsely recognizing an utterance of the user as a request to the information processing device and unnecessarily outputting reply data.

(5) The controller 13 may perform the processing of generating reply data when the controller 13 acquires voice data uttered by the user within a predetermined period after notification of a state of a unit performed by the notification device 4 starts.

Because of this configuration, when a certain period has elapsed since the start of notification performed by the notification device 4 and probability of the user paying attention to the notification device 4 is low, it is possible to prevent the information processing device 10 from falsely recognizing that the user makes an utterance relating to the notification performed by the notification device 4.

(6) The information processing device 10 may include the storage device 15 in which notification target data that indicate notification targets of the notification device 4, notification form data that indicate forms of notification through the notification targets, and description data that indicate meanings of notification through the notification targets are stored in association with one another.

A form of notification may be a position, a color, and a shape of notification in the notification device 4.

The controller 13 may perform, based on the acquired voice data and notification form data, processing of identifying a notification target that the voice data intend and processing of outputting, as reply data, description data stored in association with the identified notification target.

Because of this configuration, whether or not an utterance of the user is an utterance relating to the notification target of the notification device 4 can be determined. In addition, reply data describing meaning of notification performed by the notification device 4 can be generated.

(7) The predetermined device is the vehicle 1, and the units may include at least one of the fuel tank, the headlights, the radiator, the braking device, the vehicle dynamics control device, and the tires. Because of this configuration, understanding by the user of meaning of notification that is output with respect to the state of the fuel tank, the headlights, the radiator, the braking device, the vehicle dynamics control device, or the tires, which are mounted on the vehicle 1, can be promoted.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

REFERENCE SIGNS LIST

1 Vehicle
2 In-vehicle unit
3 Detector
4 Notification device
5 Display unit
10 Information processing device
11 Voice input device
12 Voice output device
13 Controller
14 Processor
15 Storage device

The invention claimed is:

1. An information processing device comprising a controller configured to perform processing comprising:

receiving, from a predetermined notification device configured to notify, based on detection results of states of a plurality of units in a predetermined device, the states of the plurality of units using notification targets each being a lamp or an icon corresponding to a respective one of the plurality of units, notification information indicating, as information indicating a state of notification of the notification device, which of the notification targets is used to notify a state of the one of the plurality of units;

determining, in response to the received notification information, whether or not the state of the one of the plurality of units is notified by the predetermined notification device;

starting, based on a determination result that the state of the one of the plurality of units is notified, an operation mode for recognizing voice data uttered by a user and replying to an utterance of the user;

acquiring voice data uttered by the user;

generating, according to the received notification information, reply data with respect to the acquired voice data; and outputting the generated reply data.

2. The information processing device according to claim 1, wherein the controller performs processing including:

identifying, in response to the received notification information, a notification target of the predetermined notification device; and generating, as the reply data, description data about a meaning of the notification information, the description data being stored in advance in association with the identified notification target.

3. The information processing device according to claim 1, wherein the controller performs processing including:

when determining that the state of the one of the plurality of units is notified, generating the reply data by a first voice reply program, the first voice reply program generating reply data matching the notification information; and when not determining that the state of the one of the plurality of units is notified, generating the reply data by a second voice reply program, the second voice reply program being different from the first voice reply program.

4. The information processing device according to claim 3, wherein the second voice reply program starts voice recognition processing by a specific phrase and the first voice reply program does not require the specific phrase to start voice recognition processing.

5. The information processing device according to claim 1, wherein the controller performs processing including generating the reply data when the controller acquires voice data uttered by the user within a predetermined period after notification of the state of the one of the plurality of units performed by the predetermined notification device starts, and does not perform processing of generating the reply data when the controller does not acquires the voice data within the predetermined period.

6. The information processing device according to claim 1, further comprising:

a storage unit configured to store notification target data indicating a notification target of the predetermined notification device, notification form data indicating a form of notification through the notification target, and description data indicating a meaning of notification through the notification target in association with one another.

7. The information processing device according to claim 6, wherein the form of notification is a position, a color, or a shape of notification in the predetermined notification device.

8. The information processing device according to claim 6, wherein the controller performs processing including:

identifying, based on the acquired voice data and the notification form data, the notification target intended by the voice data; and outputting, as the reply data, the description data stored in association with the identified notification target.

9. The information processing device according to claim 1, wherein the predetermined device is a vehicle, and the one of the plurality of units includes at least one of a fuel tank, headlights, a radiator, a braking device, a vehicle dynamics control device, and tires.

10. An information processing method for causing a controller to perform processing, comprising:

receiving, from a predetermined notification device configured to notify, based on detection results of states of a plurality of units in a predetermined device, the states of the plurality of units using notification targets each being a lamp or an icon corresponding to a respective one of the plurality of units, notification information indicating, as information indicating a state of notification of the notification device, which of the notification targets is used to notify a state of the one of the plurality of units;

determining, in response to the received notification information, whether or not the state of the one of the plurality of units is notified by the predetermined notification device;

starting, based on a determination result that the state of the one of the plurality of units is notified, an operation mode for recognizing voice data uttered by a user and replying to an utterance of the user;

acquiring voice data uttered by the user;

generating, according to the received notification information, reply data with respect to the acquired voice data; and outputting the generated reply data.

* * * * *